United States Patent
Lanksweirt et al.

(10) Patent No.: US 11,565,504 B2
(45) Date of Patent: Jan. 31, 2023

(54) METHOD FOR CONNECTING LAMINATION PARTS TO FORM A LAMINATION STACK

(71) Applicant: voestalpine Automotive Components Dettingen GmbH & Co. KG, Dettingen an der Erms (DE)

(72) Inventors: Jochen Lanksweirt, Heidenheim (DE); Axel Nann, Waiblingen (DE)

(73) Assignee: Voestalpine Automotive Components Dettingen GmbH & Co. KG, Dettingen an der Erms (DE)

(*) Notice: Subject to any disclaimer, the term of this patent is extended or adjusted under 35 U.S.C. 154(b) by 0 days.

(21) Appl. No.: 16/963,221

(22) PCT Filed: Jan. 18, 2019

(86) PCT No.: PCT/EP2019/051294
§ 371 (c)(1),
(2) Date: Oct. 8, 2020

(87) PCT Pub. No.: WO2019/141826
PCT Pub. Date: Jul. 25, 2019

(65) Prior Publication Data
US 2021/0046733 A1    Feb. 18, 2021

(30) Foreign Application Priority Data
Jan. 18, 2018  (EP) .................................. 18152377

(51) Int. Cl.
*B32B 7/12*      (2006.01)
*B32B 5/26*      (2006.01)
*H01F 41/02*     (2006.01)

(52) U.S. Cl.
CPC .................. *B32B 7/12* (2013.01); *B32B 5/26* (2013.01); *H01F 41/0233* (2013.01)

(58) Field of Classification Search
CPC .. B32B 37/02; B32B 3/30; B32B 7/12; B32B 37/1207; B32B 38/0004; B32B 38/06;
(Continued)

(56) References Cited

U.S. PATENT DOCUMENTS 4,578,853 A * 4/1986 Wurth .................... B21D 28/22
                                                      29/598
5,075,150 A * 12/1991 Webb .................. H01F 41/0233
                                                     428/162

(Continued)

FOREIGN PATENT DOCUMENTS

JP         S52137610 A     11/1977
JP         S57128906 A      8/1982
(Continued)

*Primary Examiner* — Michael N Orlando
*Assistant Examiner* — Christopher W Raimund

(57) ABSTRACT

A method for connecting lamination parts to form a lamination stack in which lamination parts are stamped out from an electrical strip that is coated with an activatable adhesive layer on at least one of its flat sides and the stamped-out lamination parts are stacked and glued to form lamination stacks, wherein before the lamination parts are stamped out, the electrical strip is embossed in a first sub-region, which produces multiple protruding spacers on at least one flat side of the electrical strip, which spacers, after a first lamination part is stamped out from this first sub-region, facilitate a detachment of the stacked and glued lamination parts into lamination stacks.

17 Claims, 2 Drawing Sheets

(58) Field of Classification Search
CPC ........ B32B 38/1816; B32B 2037/1215; B32B 15/011; B32B 37/12; H01F 41/0233; H02K 15/02; C21D 8/12
See application file for complete search history.

(56) References Cited

U.S. PATENT DOCUMENTS

| | | | | |
|---|---|---|---|---|
| 2005/0152063 | A1* | 7/2005 | Hara | H01Q 7/08 |
| | | | | 29/603.01 |
| 2015/0256036 | A1* | 9/2015 | Nakamura | H01F 41/024 |
| | | | | 310/216.048 |
| 2018/0374625 | A1* | 12/2018 | Chung | B32B 7/12 |

FOREIGN PATENT DOCUMENTS

| | | | | |
|---|---|---|---|---|
| JP | S59181945 | A | 10/1984 | |
| JP | 2002307636 | A | 10/2002 | |
| JP | 2004248423 | A | 9/2004 | |
| WO | 2016035959 | A1 | 3/2016 | |
| WO | 2017111249 | A1 | 6/2017 | |
| WO | 2017159926 | A1 | 9/2017 | |
| WO | 2018038357 | A1 | 3/2018 | |
| WO | WO-2018038357 | A1 * | 3/2018 | ............. H01F 41/02 |

* cited by examiner

METHOD FOR CONNECTING LAMINATION PARTS TO FORM A LAMINATION STACK

FIELD OF THE INVENTION

The invention relates to a method for connecting lamination parts.

DESCRIPTION OF THE PRIOR ART

In order to detach or divide lamination stacks that exit a stacking unit of a progressive stamping die from one another, according to the preamble to claim 1, it is known from the prior art (WO 2017/159926 A1) to provide a plurality of protruding spacers on a lamination part at the end of each lamination stack. Before the lamination part on the end is stamped out, these spacers are produced in a first sub-region by means of embossing. The protruding spacers reduce the contact area between the lamination parts and lamination stacks in the stacking unit, which reduces the strength of the integral bond or adhesive bond—whether physically or chemically cross-linked—between the lamination stacks. Spacers according to this prior art do in fact make it easier to detach or divide lamination stacks from one another, but they reduce the potential applicability of the lamination stacks—among other things because such spacers reduce the percentage of magnetically conductive material in the component. This is particularly relevant when multiple such lamination stacks are combined into one component.

For this reason, WO 2016/0035959 A1 proposes providing adhesive only in those sub-regions of the electrical strip, which after being divided from it also belong to lamination parts of the respective lamination stack. A provision of adhesive between lamination parts of different lamination stacks is omitted—which prevents the lamination stacks from getting stuck in the stacking unit. Achieving reproducibility of the method disadvantageously requires a comparatively expensive control/regulation—for example in order to avoid impairing the function of the progressive stamping die due to adhesive coming loose from the electric strip.

SUMMARY OF THE INVENTION

The object of the invention, therefore, is to provide a method for connecting lamination parts to form a lamination stack, which method features simple implementation—but does not limit the potential applicability of the lamination stacks produced therewith.

The invention attains the stated object in that in the first sub-region, spacers protruding from both flat sides of the electric strip are produced by means of embossing and the first lamination part is provided as a dividing element that is separate from the lamination stacks and is positioned between the lamination parts that are glued to one another.

If in the first sub-region, spacers protruding from both flat sides of the electric strip are produced by means of embossing, then by means of this first sub-region, the lamination stacks can be durably prevented from sticking to one another in the stacking unit. The first lamination part with the spacers protruding from both sides can thus namely be provided as a dividing element that is separate from the lamination stacks and is positioned between the glued lamination parts—and can thus prevent the lamination stacks from sticking to one another over their entire area. In other words, this makes it possible to produce a weakened bond between the lamination part and the spacer while the lamination stacks themselves are tightly packed and their lamination parts are bonded to one another over their entire area—i.e. in a particularly durable fashion.

Preferably, identically embodied spacers that protrude from both flat sides of the electric strip are produced in the first sub-region by means of embossing.

The lamination stacks can thus be easily detached or divided from one another in a simple way from a process standpoint—namely with no need to fear a geometric alteration of the lamination stacks in this connection. Among other things, this ensures the simplicity of the method because complicated steps—for example with regard to adhesive coming loose from the electric strip—are rendered moot.

In addition, by contrast with the prior art, there is no fear of any limitation to the potential applicability of the lamination stacks produced using the method according to the invention.

If in terms of their width, the spacers are embossed to at least the coating thickness of the adhesive layer, then this can already be sufficient for the spacers to withstand a comparatively high weight load and permits a reliable and simple division of the lamination stacks. The reproducibility can thus be further improved by means of the method.

If in terms of their width, the spacers are embossed to at least the sheet thickness of the electrical strip, a mechanically resilient dividing element can be produced in order to space the stacked lamination stacks apart in a durable fashion. This can further improve the reproducibility of the method.

If the width of the spacers is at least 1 mm, then this can achieve a sufficient mechanical resilience of the dividing element. This is particularly true if the width of the spacers is at least 1.5 mm.

It can also be sufficient if the width of the spacers is at most five times the sheet thickness of the electrical strip.

The detachment of the lamination stacks from each other can be carried out in a reproducible way if in terms of their height, the spacers are embossed to at least the coating thickness of the adhesive layer. It is thus possible, for example, to ensure a sufficient distance between the adhesive coating and a lamination part on one end.

If the height of the spacers is at least twice the coating thickness of the adhesive layer, then this can further facilitate the division of the lamination stacks. This can be achieved even if the electric strip is coated with an adhesive layer on both sides.

Preferably, the height of the spacers is at most three times the sheet thickness of the electrical strip in order to thus be able to ensure a sufficient spacing with a high stacking density.

It can be sufficient if the height of the spacers corresponds to the sheet thickness of the electrical strip.

If the lateral spacing between two successive spacers corresponds to at least the smallest width of these spacers, then this can be beneficial for the mechanical rigidity of the dividing element and further increase its stability. This makes it possible to further improve the reproducibility of the method.

The detachment or division of the lamination stacks can be further facilitated if the cross-section of the spacer has a trapezoidal, semicircular, or rectangular contour. A semicircular contour can be particularly advantageous in this connection—for example in order to also reliably avoid damage to adjacent lamination stacks. This makes it possible to further increase the reproducibility of the method.

The position of the dividing element between the stacked lamination stacks can be reliably adjusted if the spacers are produced so that they protrude in alternating fashion from both flat sides. It is thus possible to ensure a stable position of the dividing element in the stack with the lamination parts, which among other things can prevent the lamination parts from becoming wedged in the stacking unit—and thus in turn makes it possible to increase the reproducibility of the method.

The foregoing can be further improved if for each spacer on the first flat side of a first sub-region, two spacers are embossed on the second flat side of this first sub-region.

If the stacked lamination parts are glued to form a plurality of lamination stacks through activation of the adhesive layer, then this can lead to a particularly resilient integral bond between the lamination parts and thus to durable lamination stacks—which lamination stacks can nevertheless be reproducibly detached from one another with the aid of the dividing element. An in particular thermal activation of the adhesive layer is comparatively easy to implement. It is also conceivable to activate the adhesive layer chemically by means of an activator, accelerator, etc.

If a head section of a spacer is detached before the first lamination part is stamped out, it is possible to achieve a reducing influence on the adhesion tendency of the spacers—making it possible to further facilitate the division into lamination stacks.

BRIEF DESCRIPTION OF THE DRAWINGS

The subject of the invention is shown by way of example in the drawings based on an embodiment variant. In the drawings.

WAY TO EMBODY THE INVENTION

Figure 1:
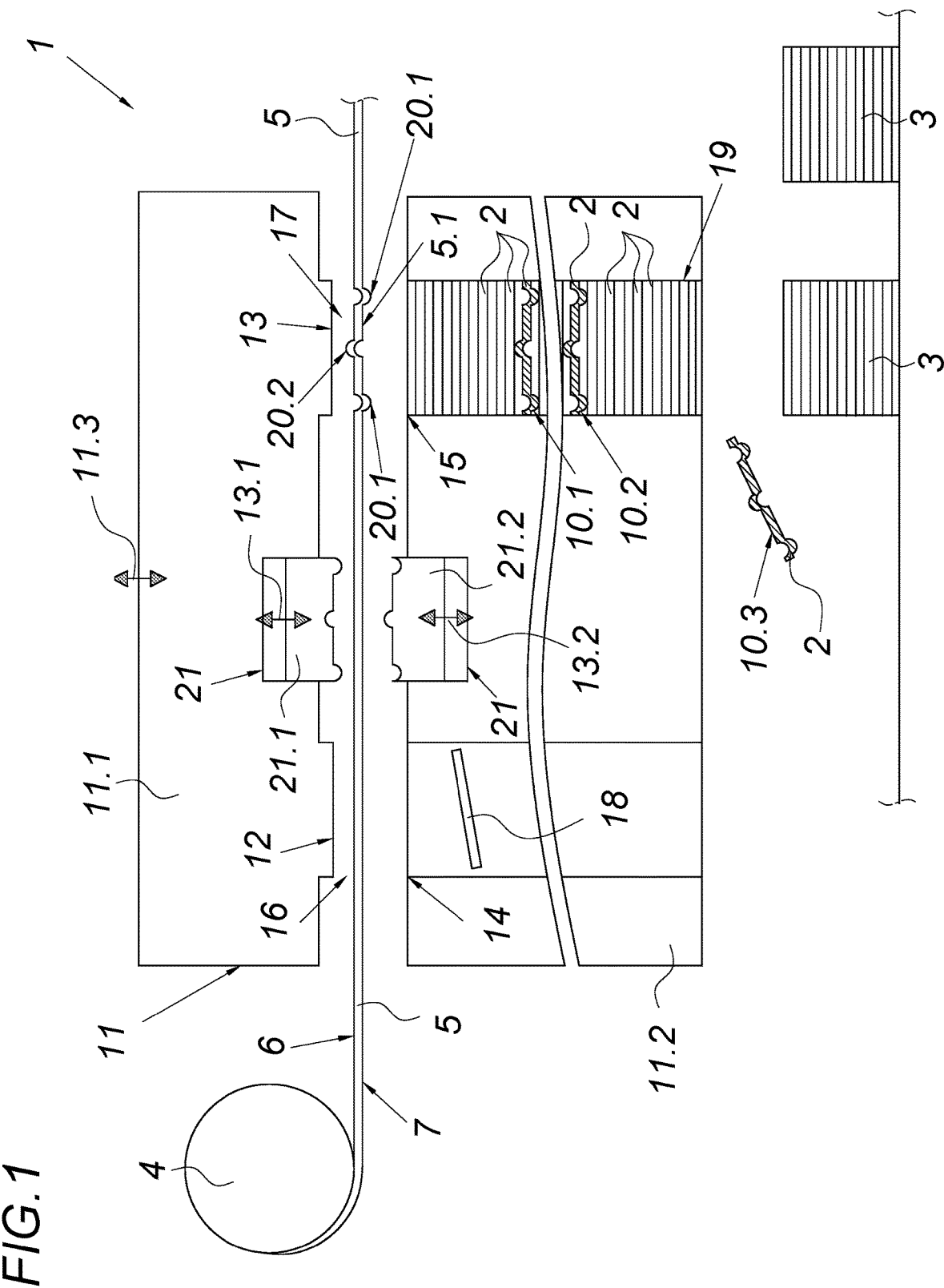
FIG. 1 shows a schematic view of a device for producing lamination stacks.

A device 1 for carrying out the method according to the invention is schematically depicted in the exemplary embodiment shown in FIG. 1. This device 1 is used for bundling stamped-out lamination parts 2 to form lamination stacks 3. For this purpose, an electric strip 5 is unwound from a coil 4 or roll, which strip has an adhesive layer 8, 9, namely thermosetting hot-melt adhesive layers, covering the entire area of one or both of its flat sides 6, 7—which adhesive layers 8, 9 are shown for example in FIG. 2 on a first lamination part 10 that is stamped out from the electric strip 5.

A stamping die 11 is used to stamp out multiple lamination parts 2 from the electric strip 5, which is coated with adhesive on both sides. Such a stamping-out—generally speaking—can be a cutting-out, cutting-off, decoupling, clipping, breaking-apart by crushing, etc.

As is also apparent from FIG. 1, the stamping die 11—for example a progressive stamping die in this case—performs a cutting with several strokes 11.3, its upper die 11.1 cooperating with its lower die 11.2. With a first cutting edge 12 of the upper die 11.1, the electric strip 5 is pre-processed for a stamping-out procedure, after which a second cutting edge 13 of the upper die 11.1 stamps out and thus separates the lamination part 2 from the electric strip 5. Such a stamping-out procedure—generally speaking—can be a cutting-out, cutting-off, decoupling, clipping, breaking-apart by crushing, etc.

The cutting edges 12, 13 cooperate with the respective matrixes 14, 15 of the lower die 11.2 and thus constitute two stamping stages 16, 17 in the stamping die 10.

Such a progressive stamping can be seen in FIG. 1 in the fact that in the pre-processing, a part 18 is separated from the electric strip 5 in order to prepare the electric strip 5 for the stamping-out of the lamination parts 2.

After this, the lamination parts 2 are stamped out with the aid of the stamping stage 17 and through pressure from the upper die 11.1, are pushed into a stacking unit 19 and stacked therein. For this purpose, the stacking unit 19 has a partially tapering guide in the lower die 11.2. This guide acts as a stack brake on the lamination parts 2, which causes the lamination parts 2 to undergo a physical bonding through pressure from the upper die 11.1 and with the aid of the adhesive layer 8, 9 provided between the lamination parts 2. The stacking unit 19 can be actively heated in order to activate the adhesive and to produce an integral bond between the lamination parts 2. In general, it is noted that it is also conceivable—but not shown—for a counter holder to be provided in the guide, which counter holder exerts a corresponding counter pressure for the gluing of the lamination parts 2. It is likewise conceivable for the lamination stacks 3 to undergo additional hardening steps—not shown—in order to strengthen and cross-link the adhesive bond between the lamination parts 2.

In order to be able to more easily divide the lamination stacks 3 from one another after they exit the stacking unit 19, the electric strip 5 is prepared in a first sub-region 5.1 by the embossing of multiple protruding, identically embodied spacers 20.1, 20.2—namely before the lamination parts 2 are stamped out. This preparation, after the first lamination part 10 is stamped out from this first sub-region 5.1, facilitates a detachment of the stacked and glued lamination parts 2 into lamination stacks 3.

According to the invention, in the first sub-region 5.1, spacers 20.1, 20.2 protruding from both flat sides 6, 7 of the electric strip 5 are produced by means of embossing. As a result, the first lamination part 10 serves as a dividing element 10.1, 10.2, 10.3 that is separate from the lamination stacks 3, which reduces the contact area between the lamination stacks 3. The first lamination part 10 is provided between the glued lamination parts 2 and thus facilitates the detachment of the lamination stacks 3 from one another as the lamination stacks 3 exit the stacking unit 19. In the exemplary embodiment, the dividing elements 10.1, 10.2 can be seen in the stacking unit 19, whereas the dividing element 10.3, after exiting the stacking unit 19, is separated out in a simple way from a process standpoint—as is likewise provided for the other dividing elements 10.1 and 10.2. The lamination stacks 3 themselves therefore have a tight packing of lamination parts 2.

The preparation of the first sub-region 5.1 is carried out by means of an embossing device 21 that has a die 21.1 and a counterpart die 21.2, which two dies can each be moved back and forth in the upper die 11.1 and lower die 11.2 as needed along a respective linear guide 13.1, 13.2.

The spacers 20.1, 20.2 have a semicircular contour in cross-section and protrude in the form of a segment of a circle from the flat side 6, 7 of the electrical strip 5 or more precisely, of the first lamination part 10. The shape of a segment of a circle proves to be of value among other things in preventing damage to the surface of the lamination parts.

The spacers 20.1, 20.2 have a width b and a height h—and these are embossed. Based on this height h, it is possible, for example, to ensure a sufficient spacing between the adhesive coating and a lamination part 2 on the end. Based on the width b, it is possible to ensure a sufficient mechanical resilience of the spacers 20.1, 20.2 when the lamination parts 2 are stacked.

For example, the electric strip 5 has a sheet thickness von 0.1 to 1 mm, namely 0.7 mm. For example, the layer thickness hk of the adhesive layers 8, 9 is 2 to 4 μm. A division into lamination stacks 3 by the dividing element 10.1, 10.2, 10.3 that is simple from a process standpoint is achieved, for example, if the spacers 20.1, 20.2 have a width b of 1.5 mm and a height h of 0.7 mm.

Figure 2:
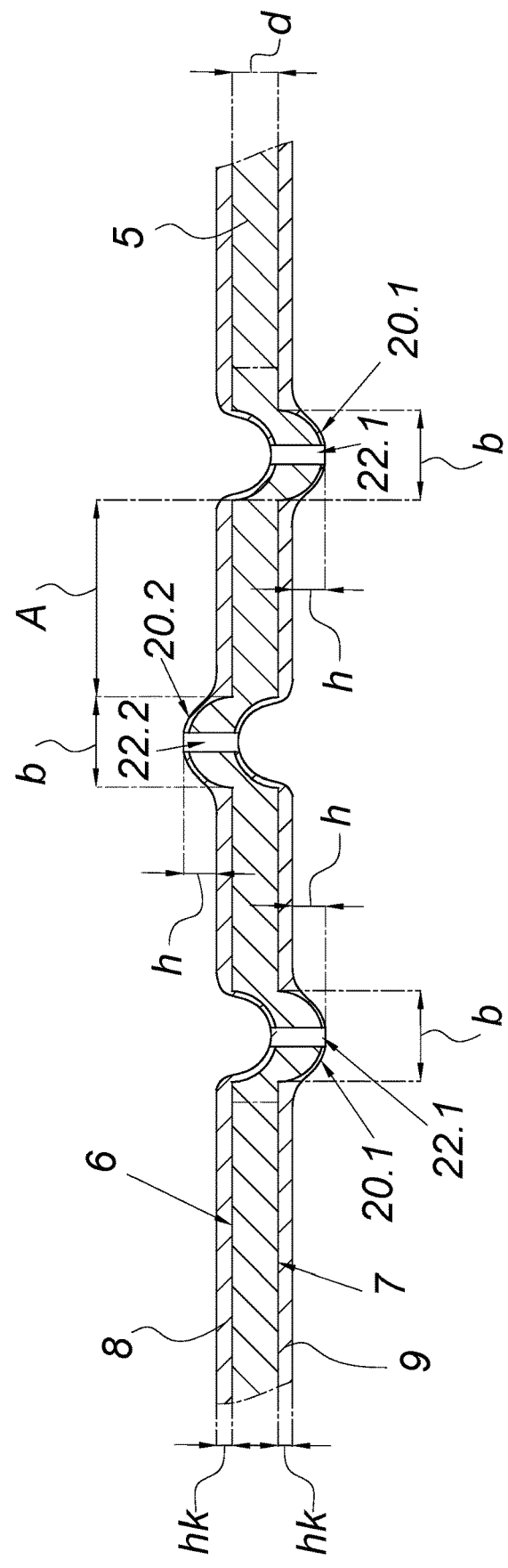
FIG. 2 shows an enlarged view of a stamped-out lamination part according to FIG. 1.

The spacers 20.1, 20.2 are produced so that they protrude in alternating fashion from both flat sides 7 and 6, as can be seen by how the spacers 20.1, 20.2 protrude downward and upward in alternating fashion in FIG. 2. Preferably, the spacers 20.1, 20.2 are produced in an embossing step.

This improves the ability to ensure the position of the dividing element between the stacked lamination stacks. As can be seen in FIG. 1, a spacer 20.2 on the first flat side 6 of the first sub-region (5.1) is adjoined by two spacers 20.1 on the second flat side 7 of this first sub-region (5.1), which second flat side 7 is oriented opposite from the first flat side 6.

Distance A between adjacent spacers 20.1, 20.2 or 20.2, 20.1 corresponds to at least the smallest width b of these spacers 20.1, 20.2.

FIG. 2 also shows that before the first lamination part 2 is stamped out, all of the spacers 20.1, 20.2 have a detached head section 22.1, 22.2. For example, this is performed by perforation of the electrical strip 5 before, during, or after the embossing of the spacers 20.1, 20.2. Preferably, the spacer 20.1, 20.2 is perforated in order to detach its head section 22.1, 22.2.

The activatable adhesive layer 8, 9 on the relevant spacers 20.1, 20.2—which is detached in a simple way from a process standpoint, for example—can thus be reduced the size, which further facilitates the division of the lamination stacks 3.

The invention claimed is:

1. A method for connecting lamination parts to form a lamination stack, comprising:
   providing an electrical strip that is coated with an activatable adhesive on both flat sides of the electrical strip;
   embossing the electrical strip in a first sub-region, which produces a plurality of protruding spacers protruding from both flat sides of the electrical strip, wherein in terms of height, the spacers are embossed to at least a coating thickness of the adhesive;
   stamping out a plurality of lamination parts from the electrical strip including a first lamination part that is stamped out from the first sub-region of the electrical strip;
   stacking the stamped-out lamination parts, and
   gluing the stamped-out lamination parts to form lamination stacks, wherein the spacers of the first lamination part facilitate a detachment of the stacked and glued lamination parts into lamination stacks.

2. The method according to claim 1, wherein in terms of width, the spacers are embossed to at least a coating thickness of the adhesive layer.

3. The method according to claim 2, wherein in terms of width, the spacers are embossed to at least a sheet thickness of the electrical strip.

4. The method according to claim 2, wherein the width of the spacers is at least 1 mm.

5. The method according to claim 3, wherein the width of the spacers is at most five times the sheet thickness of the electrical strip.

6. The method according to claim 1, wherein the height of the spacers is at least twice the coating thickness of the adhesive layer.

7. The method according to claim 1, wherein the height of the spacers is at most three times a sheet thickness of the electrical strip.

8. The method according to claim 1, wherein the height of the spacers corresponds to a sheet thickness of the electrical strip.

9. The method according to claim 1, wherein a lateral spacing between two successive spacers corresponds to at least a smallest width of these spacers.

10. The method according to claim 1, wherein a cross-section of each of the plurality of spacers has a trapezoidal, semicircular, or rectangular contour.

11. The method according to claim 1, wherein the spacers are produced to protrude in alternating fashion from both flat sides of the electrical strip.

12. The method according to claim 1, wherein for each spacer on a first flat side of a first sub-region of the electrical strip, two spacers are embossed on a second flat side of the first sub-region.

13. The method according to claim 1, wherein the stacked lamination parts are glued to form a plurality of lamination stacks through activation of the adhesive layer.

14. The method according to claim 1, wherein a head section of one of the plurality of spacers is detached before the first lamination part is stamped out.

15. The method according to claim 1, wherein the activatable adhesive layer is a hot-melt adhesive layer.

16. The method according to claim 2, wherein the width of the spacers is at least 1.5 mm.

17. The method according to claim 13, wherein the activation is thermal activation.

* * * * *